United States Patent
Tang et al.

(10) Patent No.: US 7,961,406 B2
(45) Date of Patent: *Jun. 14, 2011

(54) OPTICAL LENS SYSTEM FOR TAKING IMAGE

(75) Inventors: Hsiang-Chi Tang, Taichung (TW); Ming-Ching Lin, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/828,866

(22) Filed: Jul. 1, 2010

(65) Prior Publication Data
US 2010/0271713 A1    Oct. 28, 2010

Related U.S. Application Data

(62) Division of application No. 12/344,509, filed on Dec. 27, 2008, now Pat. No. 7,826,149.

(51) Int. Cl.
*G02B 3/02*    (2006.01)
*G02B 9/34*    (2006.01)
(52) U.S. Cl. .................. 359/715; 359/771; 359/773
(58) Field of Classification Search ............. 359/715, 359/771–773
See application file for complete search history.

(56) References Cited

U.S. PATENT DOCUMENTS

| | | | | |
|---|---|---|---|---|
| 7,289,278 B1 * | 10/2007 | Jo et al. | | 359/773 |
| 7,355,801 B2 * | 4/2008 | Chen et al. | | 359/773 |
| 7,453,654 B2 * | 11/2008 | Shinohara | | 359/773 |
| 7,558,005 B2 * | 7/2009 | Yasuhiko | | 359/715 |
| 7,609,454 B1 * | 10/2009 | Yin et al. | | 359/648 |
| 2004/0136097 A1 * | 7/2004 | Park | | 359/773 |
| 2009/0015944 A1 * | 1/2009 | Taniyama | | 359/773 |
| 2009/0097135 A1 * | 4/2009 | Yang | | 359/715 |
| 2009/0257133 A1 * | 10/2009 | Sano et al. | | 359/715 |
| 2010/0020416 A1 * | 1/2010 | Tasi | | 359/715 |

* cited by examiner

Primary Examiner — Jack Dinh (57) ABSTRACT

An optical lens system for taking image comprises, in order from the object side to the image side: a first lens element with positive refractive power having a convex object-side surface; an aperture stop; a second lens element with negative refractive power; a third lens element having a convex object-side surface; and a fourth lens element with negative refractive power having a concave object-side surface, an image-side surface of the fourth lens element being aspheric and formed with inflection points. A distance from the image-side surface of the fourth lens element to an image plane along an optical axis being BFL, a total track length of the optical lens system for taking image being TTL, and they satisfy the relation: BFL/TTL>0.12. In the optical lens system for taking image, the number of lens elements with refractive power being limited to four.

19 Claims, 8 Drawing Sheets

OPTICAL LENS SYSTEM FOR TAKING IMAGE

This application is a divisional application of U.S. patent application Ser. No. 12/344,509, which claims the benefit of the earlier filing date of Dec. 27, 2008 now U.S. Pat. No. 7,826,149. Claims 1-15 of this application are the same as the previous claims 1-15 of the U.S. patent application Ser. No. 12/344,509, claims 16-19 of this application correspond to the previous claims 29-32 of the U.S. patent application Ser. No. 12/344,509, respectively.

BACKGROUND OF THE INVENTION

1. Field of the Invention

The present invention relates to an optical lens system for taking image, and more particularly to an optical lens system for taking image used in a mobile phone camera.

2. Description of the Prior Art

In recent years, with the popularity of the mobile phone camera, the optical lens system for taking image has become thinner and thinner, and the electronic imaging sensor of a general digital camera is typically a CCD (Charge Coupled Device) or CMOS (Complementary Metal Oxide Semiconductor) sensor. Due to advances in semiconductor manufacturing, the pixel size of sensors has been reduced continuously, and miniaturized optical lens systems for taking image have increasingly higher resolution. Therefore, there's increasing demand for image quality.

A conventional high resolution mobile phone camera usually consists of a front aperture stop and four lens elements. U.S. Pat. No. 7,365,920 discloses a four-piece lens assembly, in which the first lens element and the second lens element, which are both glass spherical lens elements, are bonded to each other to form a doublet lens element for eliminating chromatic aberration. However, it suffers from the following disadvantages: the degree of freedom available in the optical system is insufficient since there are too many glass spherical lens elements; and the manufacturing difficulty is increased due to the difficult bonding process of the glass lens elements. U.S. Pat. No. 7,277,238 discloses a lens assembly with four independent lens elements including multiple aspheric lenses, so that the total track length of the optical lens system can be effectively reduced and the image quality can be effectively improved. However, since the aperture stop is located in front of the first lens element, the sensitivity of the optical lens system will be comparatively increased and the production yield of the optical lens system will be difficult to control.

The present invention mitigates and/or obviates the aforementioned disadvantages.

SUMMARY OF THE INVENTION

The primary objective of the present invention is to provide an optical lens system for taking image comprising four lens elements to improve image quality, and effectively reduce the volume of the optical lens system.

An optical lens system for taking image in accordance with the present invention comprises: in order from the object side to the image side: a first lens element with positive refractive power having a convex object-side surface; an aperture stop; a second lens element with negative refractive power; a third lens element; and a fourth lens element with negative refractive power having a concave object-side surface, an image-side surface of the fourth lens element being aspheric and formed with inflection points. In the optical lens system for taking image, the number of lens elements with refractive power is limited to four. Such an arrangement of lens elements can effectively reduce the sensitivity of the optical lens system and improve image quality.

In the present optical lens system for taking image, the refractive power of the system is mainly provided by the first lens element with positive refractive power. The second lens element with negative refractive power mainly serves to correct chromatic aberration. The third lens element serves to distribute the refractive power of the optical lens system in such a manner that the sensitivity of the optical lens system will be reduced. The fourth lens element is negative and its object-side surface is concave so that the principal point of the system will be far away from the image plane, so that the total track length of the optical lens system will be effectively reduced.

In the present optical lens system for taking image, if the third lens element is a biconvex lens element, the refractive powers of individual lens elements of the optical lens system can be effectively reduced. If the third lens element is a meniscus lens element with positive refractive power, the astigmatism caused by the system can be effectively reduced.

The first lens element provides a strong positive refractive power, and the aperture stop is located close to the object side, so that the total track length of the optical lens system can be effectively reduced, and the exit pupil of the optical lens system will be far away from the image plane. Therefore, the light will be projected onto the sensor with a relatively small incident angle, this is the telecentric feature of the image side, and this feature is very important to the photosensitive power of current solid-state sensors, since they are more sensitive when the light is incident at a small angle. This also reduces the probability of the occurrence of shading. The inflection points formed on the fourth lens element will contribute to a better correction of the incident angle of the off axis light with respect to the sensor.

In addition, for wide angle optical systems, it is especially necessary to correct the distortion and the chromatic aberration of magnification, and this can be solved by locating the aperture stop at the balance point of the refractive power of the system. In the present optical lens system for taking image, if the aperture stop is located in front of the first lens element, the telecentric feature of the optical lens system is emphasized, and the total track length of the optical lens system will become shorter. If the aperture stop is located between the first and second lens elements, the feature of wide field of view is emphasized, and the optical system is less sensitive as well.

With the trend of miniaturization of the optical lens system and the requirement of increasing the field of view, the focal length of the optical lens system is becoming very short. Therefore, the radius of curvature and the size of the lens elements must be very small, and it is impossible to make such glass lens elements by the use of conventional grinding. Plastic material is introduced to make lens elements by injection molding, using a relatively low cost to produce high precision lens elements. The lens elements are provided with aspheric surfaces, allowing more design parameter freedom (than spherical surfaces), so as to better reduce the aberration and the number of the lens elements, thus effectively reducing the total track length of the optical lens system.

According to one aspect of the present invention, in the present optical lens system for taking image, the focal length of the optical lens system for taking image is f, the focal length of the first lens element is f1, and they satisfy the relation:

$$0.8 < f/f1 < 1.45.$$

If f/f1 satisfies the above relation, the refractive power of the first lens element is more balanced and the total track length of the optical lens system can be effectively controlled, so as to maintain the objective of miniaturization of the optical lens system for taking image, and it will be favorable to correct the high order aberration of the system, improving the image quality of the optical lens system.

According to another aspect of the present invention, in the present optical lens system for taking image, the focal length of the optical lens system for taking image is f, the focal length of the third lens element is f3, and they satisfy the relation:

$$0<f/f3<0.85.$$

If f/f3 satisfies the above relation, the refractive power of the optical lens system will be more favorably distributed and excessive high order aberrations will not be produced.

According to another aspect of the present invention, in the present optical lens system for taking image, the refractive index of the first lens element is N1, the refractive index of the second lens element is N2, and they satisfy the relation:

$$|N1-N2|<0.12.$$

The above relation can allow better correction of the astigmatism of the system.

According to another aspect of the present invention, in the present optical lens system for taking image, the focal length of the optical lens system for taking image is f, the height of the image-side surface of the fourth lens element at the position of its effective optical diameter is SAG42, and they satisfy the relation:

$$SAG42/f<-0.02.$$

The above relation can effectively reduce the incident angle of the off axis light with respect to the sensor, and allow better correction of the off-axis aberration of the system.

The height of a surface at the position of the effective diameter is defined as: the height of a point on the surface at the effective diameter relative to a plane normal to the axis passing through the on-axis surface vertex. When the surface at the position of the effective diameter is closer to the image side than the on-axis surface vertex, the height is positive; if instead the surface at the position of the effective diameter is closer to the object side than the on-axis surface vertex, the height is negative.

According to another aspect of the present invention, in the present optical lens system for taking image, the Abbe number of the first lens element is V1, the Abbe number of the third lens element is V3, the Abbe number of the fourth lens element is V4, and they satisfy the relations:

$$|V1-V3|<15;$$

$$|V3-V4|>15.$$

If V1, V3, V4 satisfy the above relation, it will be favorable to correct the astigmatism of the optical lens system, improving the image quality of the optical lens system.

According to another aspect of the present invention, in the present optical lens system for taking image, the distance from the aperture stop to the image plane is SL, the total track length of the system is TTL, which is defined as a distance from the object-side surface of the first lens element to the image plane along the optical axis, and they satisfy the relation:

$$SL/TTL<0.92.$$

If SL/TTL satisfies the above relation, it will be favorable to correct the distortion and the chromatic aberration of magnification caused by the optical lens system, effectively reducing the sensitivity of the optical lens system and improving the manufacturing yield of the optical lens system.

According to another aspect of the present invention, in the present optical lens system for taking image, the radius of curvature of the object-side surface of the second lens element is R3, the radius of curvature of the image-side surface of the second lens element is R4, and they satisfy the relation:

$$-2.0<(R3+R4)/(R3-R4)<5.0.$$

If R3 and R4 satisfy the above relation, it will be favorable to correct the Petzval sum of the optical lens system.

According to another aspect of the present invention, in the present optical lens system for taking image, the radius of curvature of the object-side surface of the fourth lens element is R7, the radius of curvature of the image-side surface of the fourth lens element is R8, and they satisfy the relation:

$$R7/R8<-5.0.$$

If R7 and R8 satisfy the above relation, it will be favorable to correct the high order aberration of the optical lens system.

According to another aspect of the present invention, in the present optical lens system for taking image, the distance from the image-side surface of the fourth lens element to the image plane imaged along the optical axis is BFL, the total track length of the system is TTL, and they satisfy the relation:

$$BFL/TTL>0.12.$$

If BFL and TTL satisfy the above relation, it will be favorable to maintain enough back focal length of the system, providing the camera with enough space for assembly or focusing operation.

Further, it will be better if BFL/TTL satisfies the relation:

$$BFL/TTL>0.15.$$

According to another aspect of the present invention, in the present optical lens system for taking image, an object to be photographed is imaged on an electronic imaging sensor, the total track length of the system is TTL, the image height of the optical lens system for taking image is ImgH, which is defined as half of the length of the diagonal of the electronic imaging sensor's effective pixel region, and they satisfy the relation:

$$TTL/ImgH<2.10.$$

The above relation can maintain the objective of miniaturization of the optical lens system for taking image. Further, it will be better if TTL/ImgH satisfies the relation:

$$TTL/ImgH<1.95.$$

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1A:
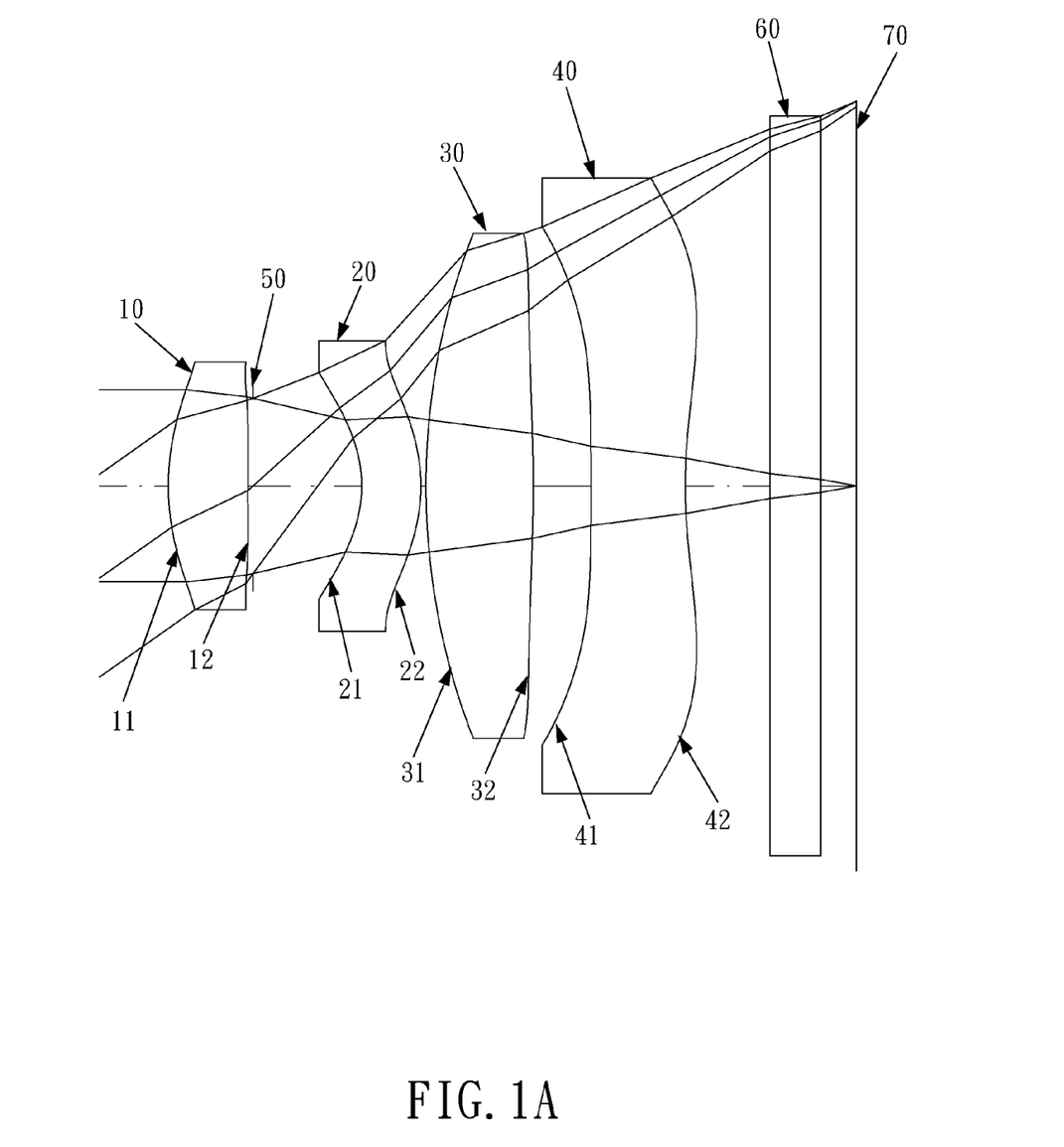
FIG. 1A shows an optical lens system for taking image in accordance with a first embodiment of the present invention.
Figure 1B:
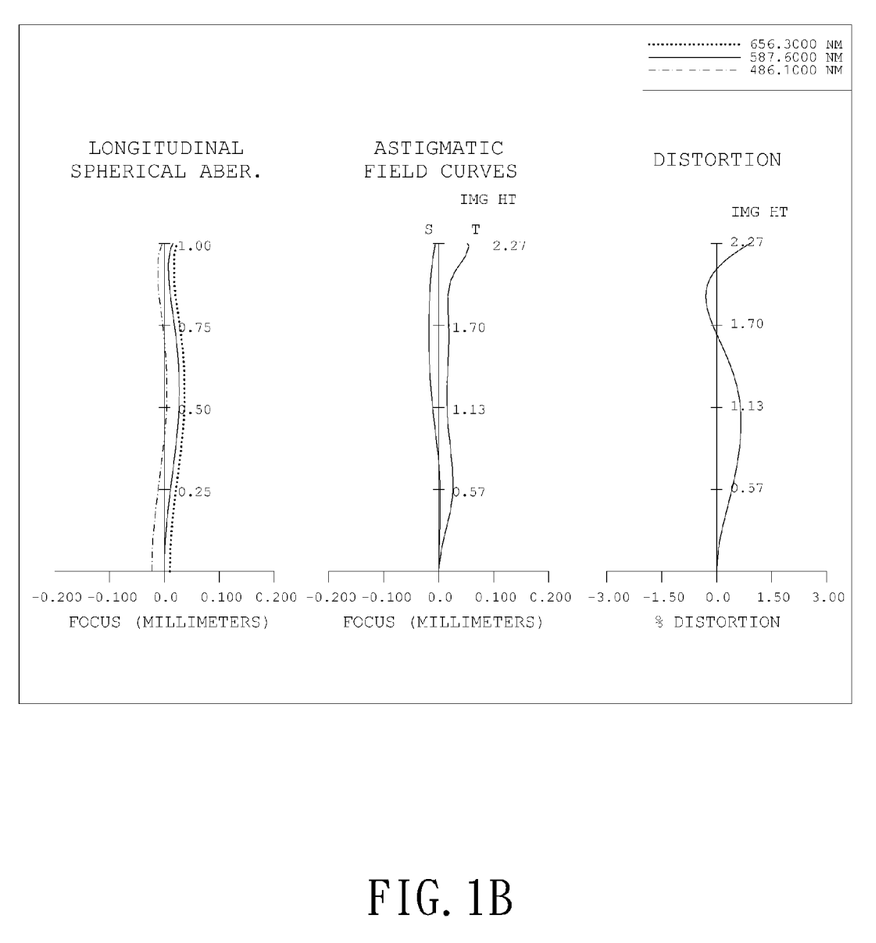
FIG. 1B shows the aberration curves of the first embodiment of the present invention.

Referring to FIG. 1A, which shows an optical lens system for taking image in accordance with a first embodiment of the present invention, and FIG. 1B shows the aberration curves of the first embodiment of the present invention. An optical lens system for taking image in accordance with the first embodiment of the present invention comprises: in order from the object side to the image side:

A plastic first lens element 10 with positive refractive power has a convex object-side surface 11 and a concave image-side surface 12, and the object-side surface 11 and the image-side surface 12 of the first lens element 10 are aspheric.

A plastic second lens element 20 with negative refractive power has a concave object-side surface 21 and a convex image-side surface 22, and the object-side surface 21 and the image-side surface 22 of the second lens element 20 are aspheric.

A plastic third lens element 30 with positive refractive power has a convex object-side surface 31 and a convex image-side surface 32, and the object-side surface 31 and the image-side surface 32 of the third lens element 30 are aspheric.

A plastic fourth lens element 40 with negative refractive power has a concave object-side surface 41 and a concave image-side surface 42, the object-side surface 41 and the image-side surface 42 of the fourth lens element 40 are aspheric, and inflection points are formed on the image-side surface 42 of the fourth lens element 40.

An aperture stop 50 is located between the first lens element 10 and the second lens element 20.

An IR cut filter 60 is located behind the fourth lens element 40 and has no influence on the focal length of the optical lens system.

An image plane 70 is located behind the IR cut filter 60.

The equation for the aspheric surface profiles of the first embodiment is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric lens surface at a distance Y from the optical axis relative to the tangential plane at the aspheric surface vertex;

Y: the distance from the point on the curve of the aspheric surface to the optical axis k: the conic coefficient;

Ai: the aspheric surface coefficient of order i.

In the first embodiment of the present optical lens system for taking image, the focal length of the optical lens system for taking image is f, the focal length of the first lens element is f1, the focal length of the third lens element is f3, and they satisfy the relations:

f=3.21 mm;

f/f1=1.15;

f/f3=0.63.

In the first embodiment of the present optical lens system for taking image, the refractive index of the first lens element is N1, the refractive index of the second lens element is N2, and they satisfy the relation:

|N1−N2|=0.088.

In the first embodiment of the present optical lens system for taking image, the Abbe number of the first lens element is V1, the Abbe number of the third lens element is V3, the Abbe number of the fourth lens element is V4, and they satisfy the relations:

|V1−V3|=0.0;

|V3−V4|=32.5.

In the first embodiment of the present optical lens system for taking image, the radius of curvature of the object-side surface of the second lens element is R3, the radius of curvature of the image-side surface of the second lens element is R4, the radius of curvature of the object-side surface of the fourth lens element is R7, the radius of curvature of the image-side surface of the fourth lens element is R8, and they satisfy the relations:

(R3+R4)/(R3−R4)=−7.14;

R7/R8=−33.39.

In the first embodiment of the present optical lens system for taking image, the distance from the aperture stop to the image plane is SL, the total track length of the optical lens system for taking image is TTL, and they satisfy the relation:

SL/TTL=0.87.

In the first embodiment of the present optical lens system for taking image, the distance from the image-side surface of the fourth lens element to the image plane along the optical axis is BFL, the total track length of the optical lens system for taking image is TTL, and they satisfy the relation:

BFL/TTL=0.23.

In the first embodiment of the present optical lens system for taking image, the height of the image-side surface of the fourth lens element at the position of its effective optical diameter is SAG42, the focal length of the optical lens system for taking image is f, and they satisfy the relation:

SAG42/f=−0.06.

In the first embodiment of the present optical lens system for taking image, an object to be photographed is imaged on an electronic imaging sensor, the total track length of the optical lens system for taking image is TTL, the image height of the optical lens system for taking image is ImgH, and they satisfy the relation:

TTL/ImgH=1.75.

The detailed optical data of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f(focal length) = 3.21 mm, Fno = 2.8, HFOV (half of field of view) = 35.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.48741(ASP) | 0.470 | Plastic | 1.544 | 55.9 | 2.8 |
| 2 | | 59.73350(ASP) | 0.030 | | | | |
| 3 | Aperture Stop | Plano | 0.641 | | | | |
| 4 | Lens 2 | −0.78317(ASP) | 0.350 | Plastic | 1.632 | 23.4 | −10.75 |
| 5 | | −1.03843(ASP) | 0.030 | | | | |
| 6 | Lens 3 | 4.06750(ASP) | 0.632 | Plastic | 1.544 | 55.9 | 5.11 |
| 7 | | −8.30560(ASP) | 0.341 | | | | |
| 8 | Lens 4 | −100.00000(ASP) | 0.556 | Plastic | 1.632 | 23.4 | −4.59 |
| 9 | | 2.99458(ASP) | 0.500 | | | | |
| 10 | IR-filter | Plano | 0.300 | Glass | 1.517 | 64.2 | |
| 11 | | Plano | 0.209 | | | | |
| 12 | Image | Plano | | | | | |

TABLE 2

Aspheric Coefficients

| Surface # | 1 | 2 | 4 | 5 |
|---|---|---|---|---|
| k = | −1.64312E+00 | 9.83111E+03 | −1.31866E+00 | −1.39121E+00 |
| A4 = | 2.05983E−03 | −9.64001E−02 | −6.90634E−02 | 2.29452E−02 |
| A6 = | 4.38689E−02 | −1.70388E−01 | 3.44586E−01 | 2.10166E−01 |
| A8 = | −3.01483E−01 | −8.08614E−02 | 3.14148E−01 | 1.89746E−01 |
| A10 = | | | −8.17877E−03 | 2.81916E−02 |
| A12 = | | | −1.05630E+00 | −1.63917E−01 |
| A14 = | | | −2.21800E+00 | −1.34014E−01 |
| A16 = | | | 3.15573E+00 | 1.09975E−01 |

| Surface # | 6 | 7 | 8 | 9 |
|---|---|---|---|---|
| k = | −9.14124E+00 | −5.00000E+02 | 5.00000E+02 | −1.94208E+01 |
| A4 = | 1.13156E−02 | 6.59157E−03 | −6.92771E−02 | −5.76671E−02 |
| A6 = | 1.18631E−03 | −2.05575E−04 | 1.52196E−03 | 3.53287E−03 |
| A8 = | −6.92112E−04 | −1.62252E−04 | 3.36222E−03 | −2.38146E−04 |
| A10 = | 2.85671E−05 | −1.27911E−04 | 3.93199E−04 | −7.71404E−05 |
| A12 = | 4.69629E−05 | −9.41612E−05 | −7.04064E−05 | 4.28222E−06 |
| A14 = | −1.29087E−05 | −3.51411E−05 | −5.14384E−05 | 7.17322E−06 |
| A16 = | 6.56660E−07 | −5.87920E−06 | −1.65023E−05 | 2.06428E−06 |

Figure 2A:
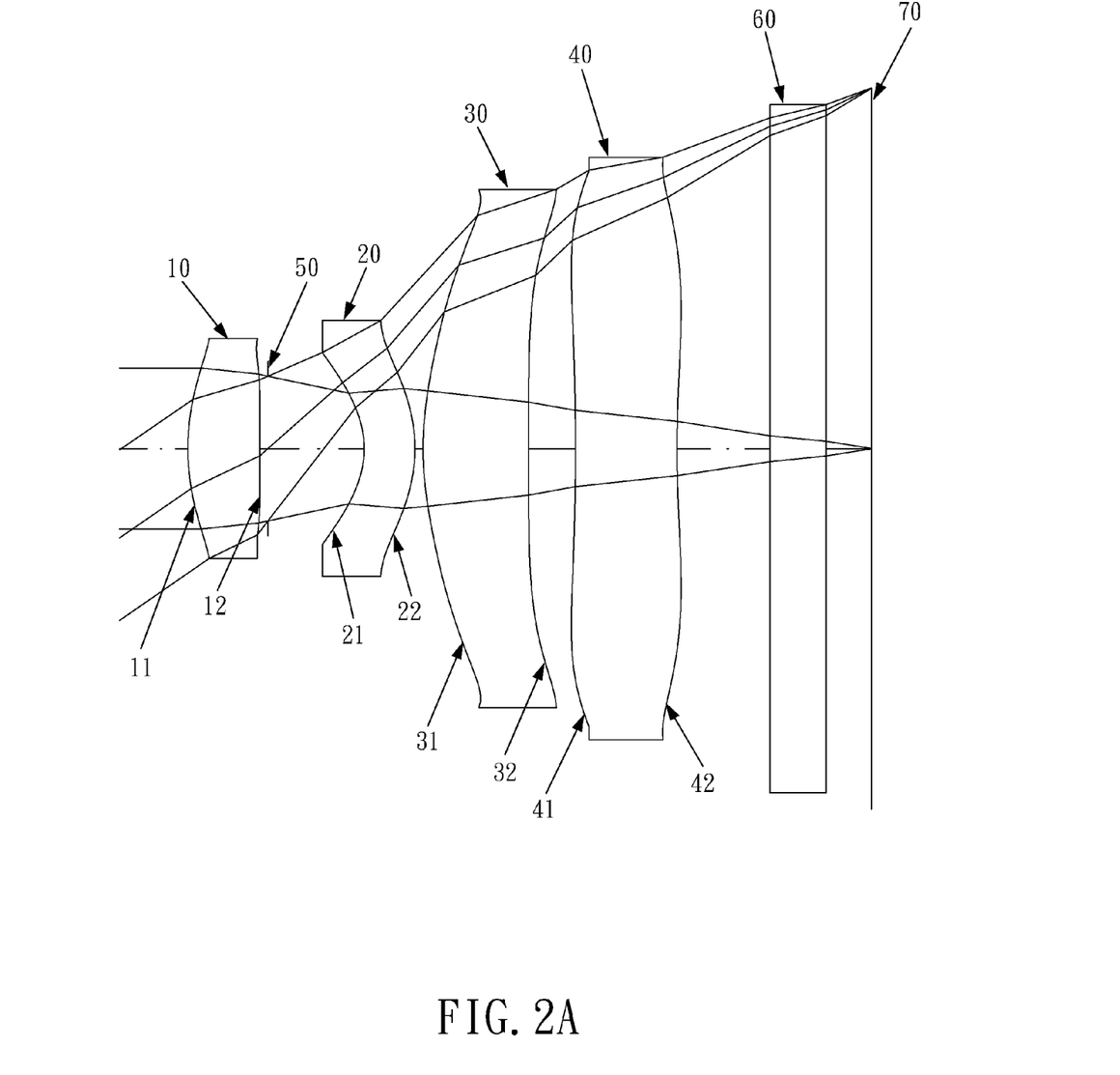
FIG. 2A shows an optical lens system for taking image in accordance with a second embodiment of the present invention.
Figure 2B:
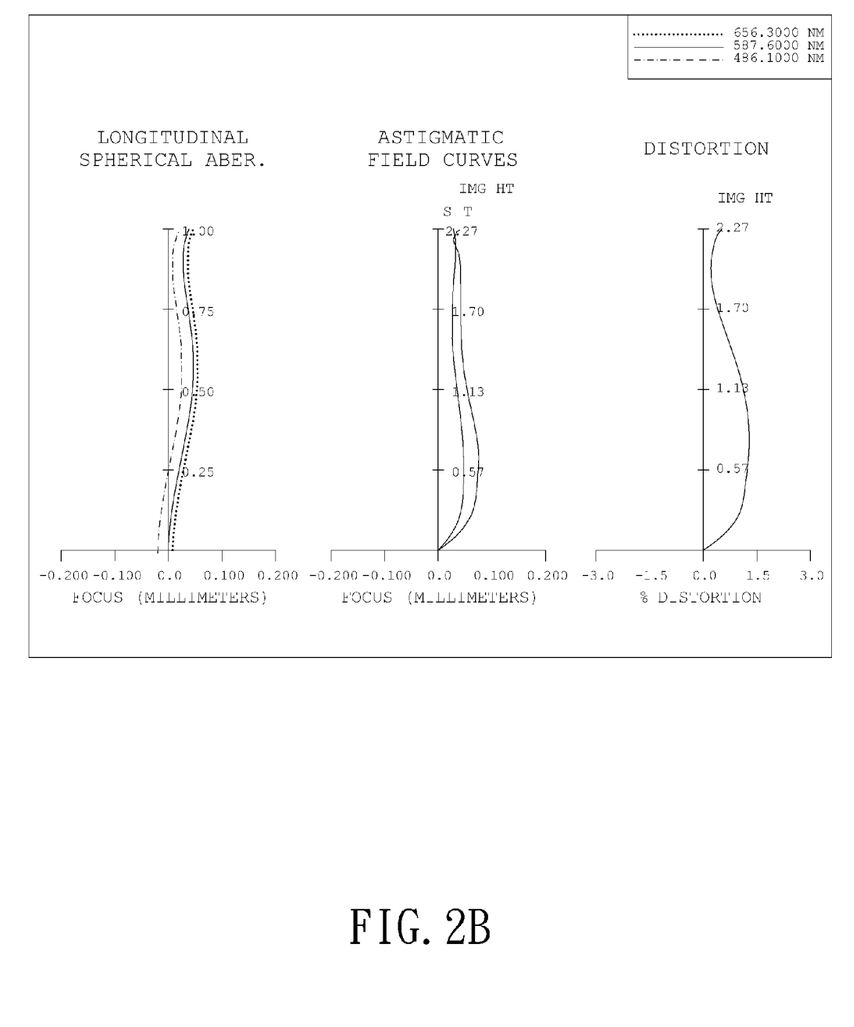
FIG. 2B shows the aberration curves of the second embodiment of the present invention.

Referring to FIG. 2A, which shows an optical lens system for taking image in accordance with a second embodiment of the present invention, and FIG. 2B shows the aberration curves of the second embodiment of the present invention. The second embodiment of the present invention comprises: in order from the object side to the image side:

A plastic first lens element 10 with positive refractive power has a convex object-side surface 11 and a concave image-side surface 12, and the object-side surface 11 and the image-side surface 12 of the first lens element 10 are aspheric.

A plastic second lens element 20 with negative refractive power has a concave object-side surface 21 and a convex image-side surface 22, and the object-side surface 21 and the image-side surface 22 of the second lens element 20 are aspheric.

A plastic third lens element 30 with positive refractive power has a convex object-side surface 31 and a convex image-side surface 32, and the object-side surface 31 and the image-side surface 32 of the third lens element 30 are aspheric.

A plastic fourth lens element 40 with negative refractive power has a concave object-side surface 41 and a concave image-side surface 42, the object-side surface 41 and the image-side surface 42 of the fourth lens element 40 are aspheric, and inflection points are formed on the image-side surface 42 of the fourth lens element 40.

An aperture stop 50 is located between the first lens element 10 and the second lens element 20.

An IR cut filter 60 is located behind the fourth lens element 40 and has no influence on the focal length of the optical lens system.

An image plane 70 is located behind the IR cut filter 60.

The equation for the aspheric surface profiles of the second embodiment has the same form as that of the first embodiment.

In the second embodiment of the present optical lens system for taking image, the focal length of the optical lens system for taking image is f, the focal length of the first lens element is f1, the focal length of the third lens element is f3, and they satisfy the relations:

$f=3.30$ mm;

$f/f1=1.19$;

$f/f3=1.04$.

In the second embodiment of the present optical lens system for taking image, the refractive index of the first lens element is N1, the refractive index of the second lens element is N2, and they satisfy the relation:

$|N1-N2|=0.088.$

In the second embodiment of the present optical lens system for taking image, the Abbe number of the first lens element is V1, the Abbe number of the third lens element is V3, the Abbe number of the fourth lens element is V4, and they satisfy the relations:

$|V1-V3|=0.0;$ $|V3-V4|=0.0.$

In the second embodiment of the present optical lens system for taking image, the radius of curvature of the object-side surface of the second lens element is R3, the radius of curvature of the image-side surface of the second lens element is R4, the radius of curvature of the object-side surface of the fourth lens element is R7, the radius of curvature of the image-side surface of the fourth lens element is R8, and they satisfy the relations:

$(R3+R4)/(R3-R4)=-4.00;$ $R7/R8=-2.93.$

In the second embodiment of the present optical lens system for taking image, the distance from the aperture stop to the image plane is SL, the total track length of the optical lens system for taking image is TTL, and they satisfy the relation:

$SL/TTL=0.88.$

In the second embodiment of the present optical lens system for taking image, the distance from the image-side surface of the fourth lens element to the image plane along the optical axis is BFL, the total track length of the optical lens system for taking image is TTL, and they satisfy the relation:

$BFL/TTL=0.26.$

In the second embodiment of the present optical lens system for taking image, the height of the image-side surface of the fourth lens element at the position of its effective optical diameter is SAG42, the focal length of the optical lens system for taking image is f, and they satisfy the relation:

$SAG42/f=-0.03.$

In the second embodiment of the present optical lens system for taking image, an object to be photographed is imaged on an electronic imaging sensor, the total track length of the optical lens system for taking image is TTL, the image height of the optical lens system for taking image is ImgH, and they satisfy the relation:

$TTL/ImgH=1.85.$

The detailed optical data of the second embodiment is shown in table 3, and the aspheric surface data is shown in table 4, wherein the units of the radius of curvature, the thickness and the focal length are expressed in mm, and HFOV is half of the maximal field of view.

TABLE 3

(Embodiment 2)
f(focal length) = 3.30 mm, Fno = 3.2, HFOV (half of field of view) = 34.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.49225(ASP) | 0.455 | Plastic | 1.544 | 55.9 | 2.78 |
| 2 | | 97.08670(ASP) | 0.050 | | | | |
| 3 | Aperture Stop | Plano | 0.607 | | | | |
| 4 | Lens 2 | −0.59031(ASP) | 0.320 | Plastic | 1.632 | 23.4 | −3.41 |
| 5 | | −0.98328(ASP) | 0.050 | | | | |
| 6 | Lens 3 | 1.80403(ASP) | 0.667 | Plastic | 1.544 | 55.9 | 3.18 |
| 7 | | −36.50780(ASP) | 0.294 | | | | |
| 8 | Lens 4 | −20.04860(ASP) | 0.640 | Plastic | 1.544 | 55.9 | −9.3 |
| 9 | | 6.84390(ASP) | 0.588 | | | | |
| 10 | IR-filter | Plano | 0.353 | Glass | 1.517 | 64.2 | |
| 11 | | Plano | 0.283 | | | | |
| 12 | Image | Plano | | | | | |

TABLE 4

Aspheric Coefficients

| Surface # | 1 | 2 | 4 | 5 |
|---|---|---|---|---|
| k = | −1.61842E+00 | −4.19490E+06 | −2.09685E+00 | −1.08039E+00 |
| A4 = | −7.70011E−03 | −1.07307E−01 | −2.61630E−01 | 7.55101E−03 |
| A6 = | 2.47207E−02 | −4.01585E−01 | 1.25057E−01 | 3.26402E−01 |
| A8 = | −4.18851E−01 | 3.27151E−01 | 1.45930E+00 | 2.16685E−01 |
| A10 = | | | −1.34798E−01 | 3.13855E−02 |
| A12 = | | | −3.95558E+00 | −2.22005E−01 |
| A14 = | | | 4.01192E+00 | −2.39018E−01 |
| A16 = | | | −1.01176E+01 | 1.38699E−01 |

| Surface # | 6 | 7 | 8 | 9 |
|---|---|---|---|---|
| k = | −2.11377E+01 | −1.53497E+06 | 1.00000E+02 | −1.09707E+01 |
| A4 = | 2.26620E−02 | 2.70394E−02 | −8.51000E−03 | −5.31072E−02 |

TABLE 4-continued

| Aspheric Coefficients | | | | |
|---|---|---|---|---|
| A6 = | 4.48373E−03 | 4.70257E−03 | 9.85288E−03 | 7.45684E−03 |
| A8 = | −2.49395E−03 | −1.73126E−04 | 1.13552E−03 | −2.54163E−04 |
| A10 = | −2.96163E−04 | −2.35891E−04 | −1.51890E−04 | −1.00336E−04 |
| A12 = | 2.76924E−04 | −9.64609E−05 | −9.06310E−05 | 1.58596E−05 |
| A14 = | 9.03809E−05 | −2.68595E−05 | −1.59761E−05 | 1.20298E−05 |
| A16 = | −7.84610E−05 | −2.18922E−06 | 5.32112E−06 | 6.91807E−07 |

Figure 3A:
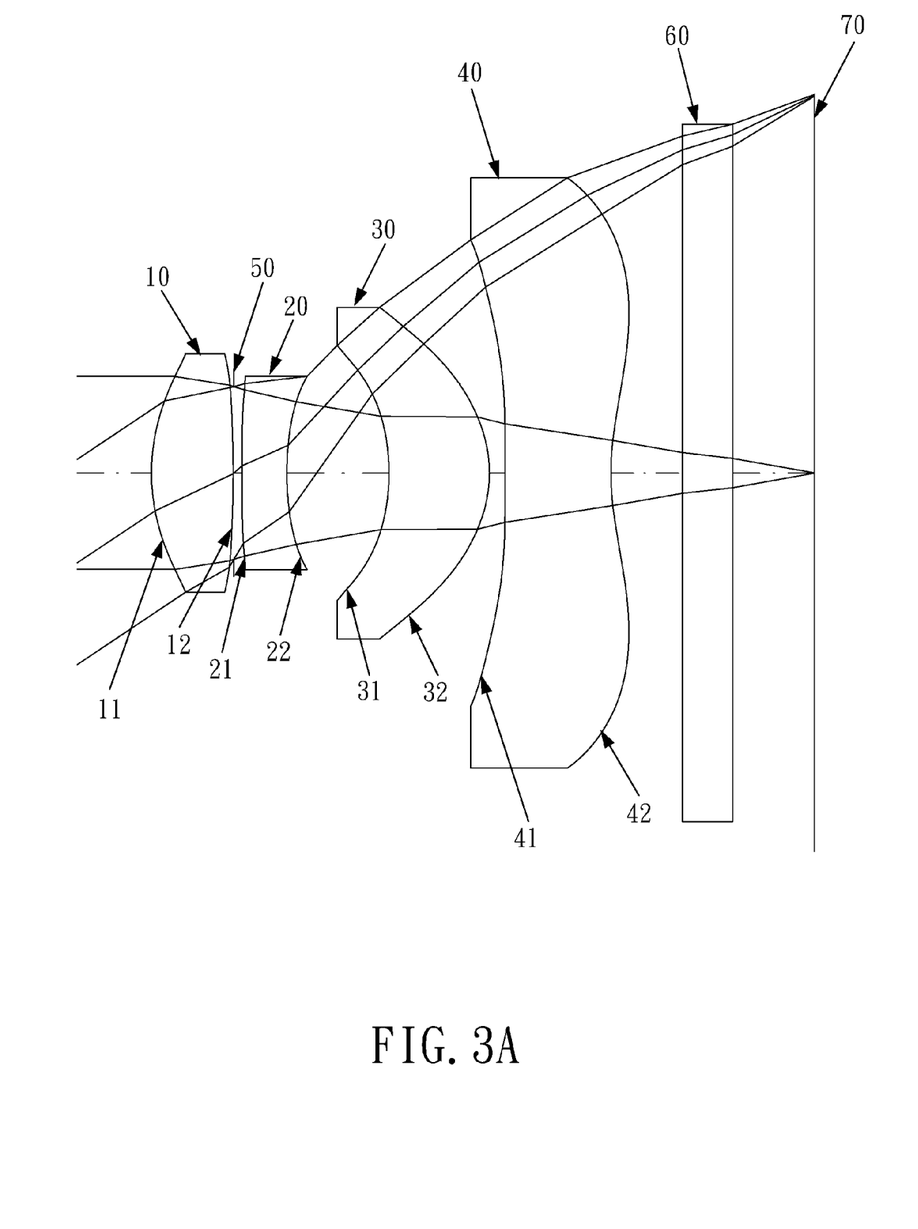
FIG. 3A shows an optical lens system for taking image in accordance with a third embodiment of the present invention.
Figure 3B:
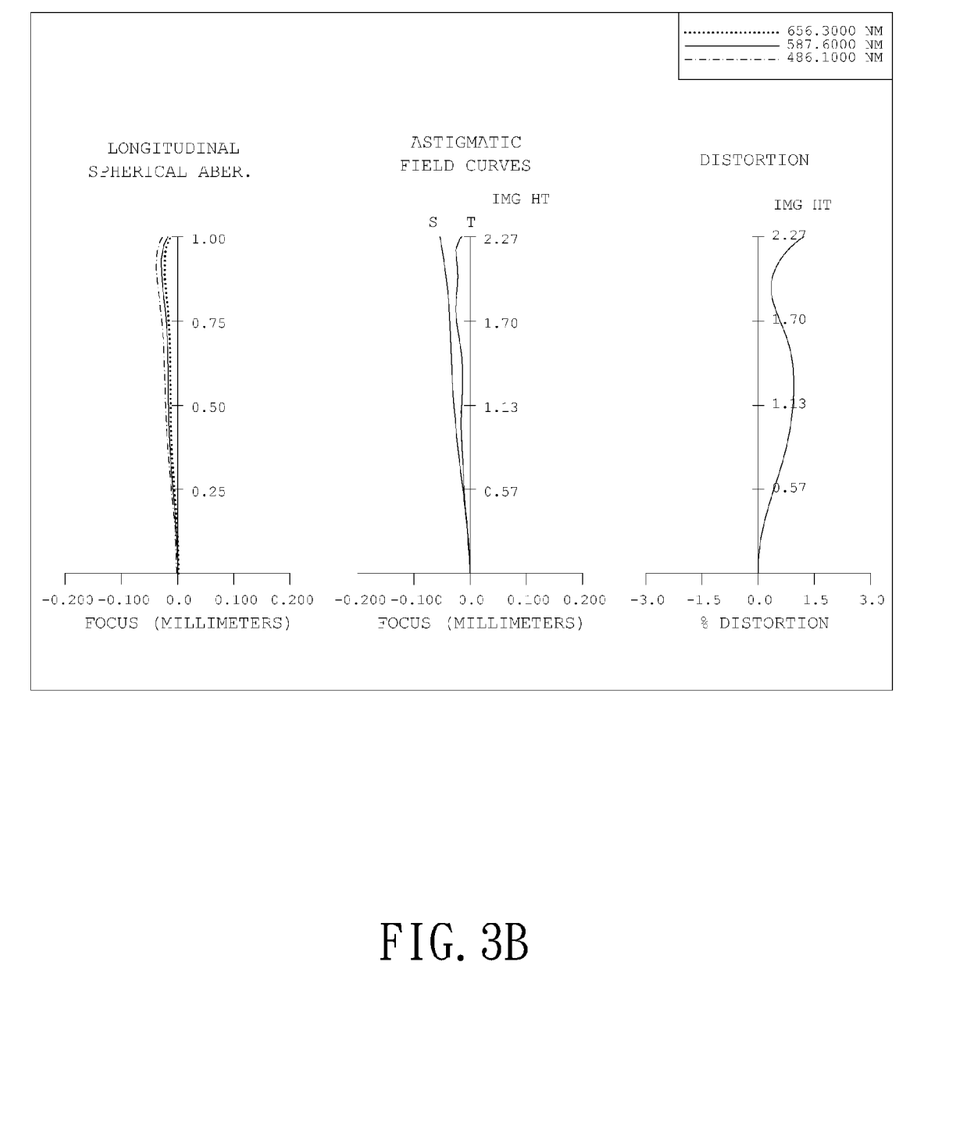
FIG. 3B shows the aberration curves of the third embodiment of the present invention.

Referring to FIG. 3A, which shows an optical lens system for taking image in accordance with a third embodiment of the present invention, FIG. 3B shows the aberration curves of the third embodiment of the present invention. The third embodiment of the present invention comprises: in order from the object side to the image side:

A plastic first lens element 10 with positive refractive power has a convex object-side surface 11 and a convex image-side surface 12, and the object-side surface 11 and the image-side surface 12 of the first lens element 10 are aspheric.

A plastic second lens element 20 with negative refractive power has a concave object-side surface 21 and a concave image-side surface 22, and the object-side surface 21 and the image-side surface 22 of the second lens element 20 are aspheric.

A plastic third lens element 30 with positive refractive power has a concave object-side surface 31 and a convex image-side surface 32, and the object-side surface 31 and the image-side surface 32 of the third lens element 30 are aspheric.

A plastic fourth lens element 40 with negative refractive power has a concave object-side surface 41 and a concave image-side surface 42, the object-side surface 41 and the image-side surface 42 of the fourth lens element 40 are aspheric, and inflection points are formed on the image-side surface 42 of the fourth lens element 40.

An aperture stop 50 is located between the first lens element 10 and the second lens element 20.

An IR cut filter 60 is located behind the fourth lens element 40 and has no influence on the focal length of the optical lens system.

An image plane 70 is located behind the IR cut filter 60.

The equation for the aspheric surface profiles of the third embodiment has the same form as that of the first embodiment.

In the third embodiment of the present optical lens system for taking image, the focal length of the optical lens system for taking image is f, the focal length of the first lens element is f1, the focal length of the third lens element is f3, and they satisfy the relations:

$f=3.35$ mm;

$f/f1=1.75$;

$f/f3=1.21$.

In the third embodiment of the present optical lens system for taking image, the refractive index of the first lens element is N1, the refractive index of the second lens element is N2, and they satisfy the relation:

$|N1-N2|=0.088$.

In the third embodiment of the present optical lens system for taking image, the Abbe number of the first lens element is V1, the Abbe number of the third lens element is V3, the Abbe number of the fourth lens element is V4, and they satisfy the relations:

$|V1-V3|=0.1$;

$|V3-V4|=0.0$.

In the third embodiment of the present optical lens system for taking image, the radius of curvature of the object-side surface of the second lens element is R3, the radius of curvature of the image-side surface of the second lens element is R4, the radius of curvature of the object-side surface of the fourth lens element is R7, the radius of curvature of the image-side surface of the fourth lens element is R8, and they satisfy the relations:

$(R3+R4)/(R3-R4)=0.96$;

$R7/R8=-63.91$.

In the third embodiment of the present optical lens system for taking image, the distance from the aperture stop to the image plane is SL, the total track length of the optical lens system for taking image is TTL, and they satisfy the relation:

$SL/TTL=0.87$.

In the third embodiment of the present optical lens system for taking image, the distance from the image-side surface of the fourth lens element to the image plane along the optical axis is BFL, the total track length of the optical lens system for taking image is TTL, and they satisfy the relation:

$BFL/TTL=0.29$.

In the third embodiment of the present optical lens system for taking image, the height of the image-side surface of the fourth lens element at the position of its effective optical diameter is SAG42, the focal length of the optical lens system for taking image is f, and they satisfy the relation:

$SAG42/f=-0.08$.

In the third embodiment of the present optical lens system for taking image, an object to be photographed is imaged on an electronic imaging sensor, the total track length of the optical lens system for taking image is TTL, the image height of the optical lens system for taking image is ImgH, and they satisfy the relation:

$TTL/ImgH=1.71$.

The detailed optical data of the third embodiment is shown in table 5, and the aspheric surface data is shown in table 6, wherein the units of the radius of curvature, the thickness and the focal length are expressed in mm, and HFOV is half of the maximal field of view.

TABLE 5

(Embodiment 3)
f(focal length) = 3.35 mm, Fno = 2.9, HFOV (half of field of view) = 33.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.21635(ASP) | 0.490 | Plastic | 1.544 | 55.9 | 1.91 |
| 2 | | −6.04240(ASP) | 0.005 | | | | |
| 3 | Aperture Stop | Plano | 0.049 | | | | |
| 4 | Lens 2 | −90.08370(ASP) | 0.270 | Plastic | 1.632 | 23.4 | −3.1 |
| 5 | | 2.00415(ASP) | 0.613 | | | | |
| 6 | Lens 3 | −1.28956(ASP) | 0.603 | Plastic | 1.530 | 55.8 | 2.78 |
| 7 | | −0.79929(ASP) | 0.095 | | | | |
| 8 | Lens 4 | −100.00000(ASP) | 0.635 | Plastic | 1.530 | 55.8 | −2.9 |
| 9 | | 1.56482(ASP) | 0.430 | | | | |
| 10 | IR-filter | Plano | 0.300 | Glass | 1.517 | 64.2 | |
| 11 | | Plano | 0.493 | | | | |
| 12 | Image | Plano | | | | | |

TABLE 6

Aspheric Coefficients

| Surface # | 1 | 2 | 4 | 5 |
|---|---|---|---|---|
| k = | −3.55077E−01 | 2.93499E+00 | 2.35473E+04 | 2.71606E+00 |
| A4 = | 5.36775E−03 | 1.89899E−01 | 3.81627E−01 | 2.54776E−01 |
| A6 = | −1.36818E−01 | −4.07722E−01 | −6.01381E−01 | −1.79844E−01 |
| A8 = | 3.87983E−01 | −5.29106E−01 | 1.82084E−01 | 4.98212E−01 |
| A10 = | −8.50583E−01 | 9.56898E−01 | 6.49611E−01 | |

| Surface # | 6 | 7 | 8 | 9 |
|---|---|---|---|---|
| k = | 2.57153E−01 | −8.61389E−01 | −1.15250E+04 | −9.76748E+00 |
| A4 = | −6.17848E−02 | 8.07578E−02 | −1.71285E−01 | −1.49222E−01 |
| A6 = | −5.94131E−01 | −2.06229E−01 | 1.05190E−01 | 8.31522E−02 |
| A8 = | 5.79064E−01 | 3.53647E−02 | −1.30834E−02 | −3.71461E−02 |
| A10 = | 5.46547E−01 | −2.22300E−02 | −7.81108E−03 | 6.73686E−03 |
| A12 = | 3.77591E−02 | 1.49888E−01 | 5.52897E−04 | 8.22561E−04 |
| A14 = | −3.52552E+00 | 1.19465E−01 | 9.38723E−04 | −4.93540E−04 |
| A16 = | 4.87822E+00 | −1.57199E−01 | −2.29925E−04 | 4.68785E−05 |

Figure 4A:
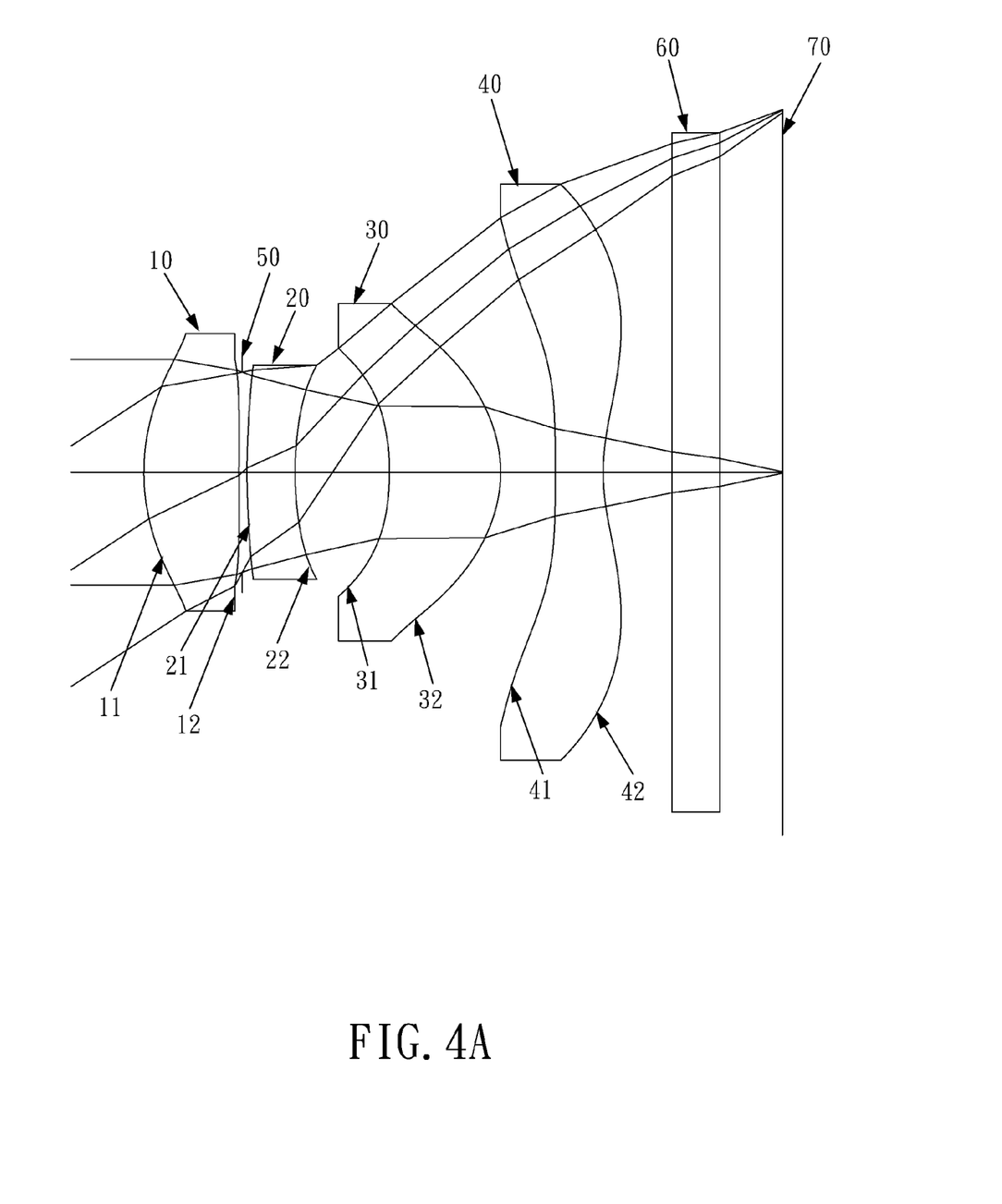
FIG. 4A shows an optical lens system for taking image in accordance with a fourth embodiment of the present invention.
Figure 4B:
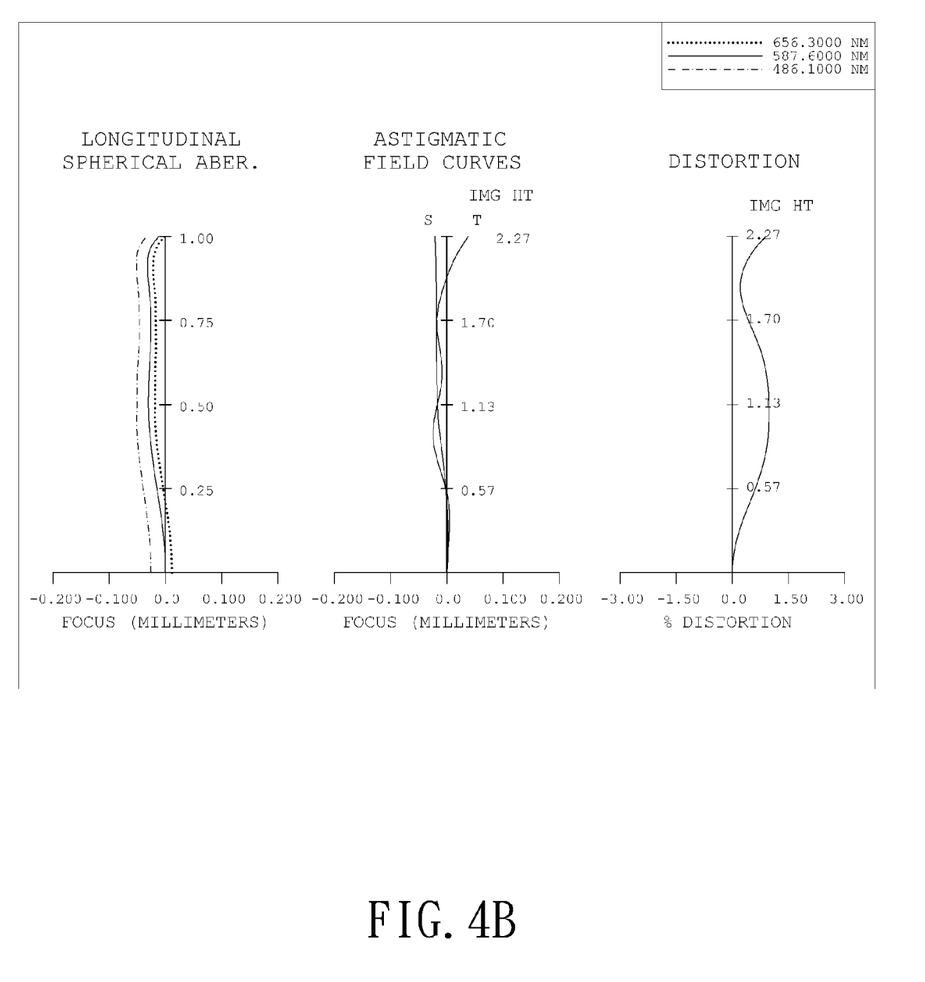
FIG. 4B shows the aberration curves of the fourth embodiment of the present invention.

Referring to FIG. 4A, which shows an optical lens system for taking image in accordance with a fourth embodiment of the present invention, FIG. 4B shows the aberration curves of the fourth embodiment of the present invention. The fourth embodiment of the present invention comprises: in order from the object side to the image side:

A plastic first lens element 10 with positive refractive power has a convex object-side surface 11 and a concave image-side surface 12, and the object-side surface 11 and the image-side surface 12 of the first lens element 10 are aspheric.

A plastic second lens element 20 with negative refractive power has a convex object-side surface 21 and a concave image-side surface 22, and the object-side surface 21 and the image-side surface 22 of the second lens element 20 are aspheric.

A plastic third lens element 30 with positive refractive power has a concave object-side surface 31 and a convex image-side surface 32, and the object-side surface 31 and the image-side surface 32 of the third lens element 30 are aspheric.

A plastic fourth lens element 40 with negative refractive power has a concave object-side surface 41 and a concave image-side surface 42, the object-side surface 41 and the image-side surface 42 of the fourth lens element 40 are aspheric, and inflection points are formed on the image-side surface 42 of the fourth lens element 40.

An aperture stop 50 is located between the first lens element 10 and the second lens element 20.

An IR cut filter 60 is located behind the fourth lens element 40 and has no influence on the focal length of the optical lens system.

An image plane 70 is located behind the IR cut filter 60.

The equation for the aspheric surface profiles of the fourth embodiment has the same form as that of the first embodiment.

In the fourth embodiment of the present optical lens system for taking image, the focal length of the optical lens system for taking image is f, the focal length of the first lens element is f1, the focal length of the third lens element is f3, and they satisfy the relations:

$f=3.41$ mm;

$f/f1=1.31$;

$f/f3=1.34$.

In the fourth embodiment of the present optical lens system for taking image, the refractive index of the first lens element is N1, the refractive index of the second lens element is N2, and they satisfy the relation:

$|N1-N2|=0.088$.

In the fourth embodiment of the present optical lens system for taking image, the Abbe number of the first lens element is V1, the Abbe number of the third lens element is V3, the Abbe number of the fourth lens element is V4, and they satisfy the relations:

$|V1-V3|=0.0;$ $|V3-V4|=0.4.$

In the fourth embodiment of the present optical lens system for taking image, the radius of curvature of the object-side surface of the second lens element is R3, the radius of curvature of the image-side surface of the second lens element is R4, the radius of curvature of the object-side surface of the fourth lens element is R7, the radius of curvature of the image-side surface of the fourth lens element is R8, and they satisfy the relations:

$(R3+R4)/(R3-R4)=2.72;$ $R7/R8=-76.46.$

In the fourth embodiment of the present optical lens system for taking image, the distance from the aperture stop to the image plane is SL, the total track length of the optical lens system for taking image is TTL, and they satisfy the relation:

$SL/TTL=0.84.$

In the fourth embodiment of the present optical lens system for taking image, the distance from the image-side surface of the fourth lens element to the image plane along the optical axis is BFL, the total track length of the optical lens system for taking image is TTL, and they satisfy the relation:

$BFL/TTL=0.26.$

In the fourth embodiment of the present optical lens system for taking image, the height of the image-side surface of the fourth lens element at the position of its effective optical diameter is SAG42, the focal length of the optical lens system for taking image is f, and they satisfy the relation:

$SAG42/f=-0.08.$

In the fourth embodiment of the present optical lens system for taking image, an object to be photographed is imaged on an electronic imaging sensor, the total track length of the optical lens system for taking image is TTL, the image height of the optical lens system for taking image is ImgH, and they satisfy the relation:

$TTL/ImgH=1.72.$

The detailed optical data of the fourth embodiment is shown in table 7, and the aspheric surface data is shown in table 8, wherein the units of the radius of curvature, the thickness and the focal length are expressed in mm, and HFOV is half of the maximal field of view.

TABLE 7

(Embodiment 4)
f(focal length) = 3.41 mm, Fno = 2.43, HFOV (half of field of view) = 33.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.32960(ASP) | 0.596 | Plastic | 1.544 | 55.9 | 2.61 |
| 2 | | 17.34820(ASP) | 0.020 | | | | |
| 3 | Aperture Stop | Plano | 0.030 | | | | |
| 4 | Lens 2 | 4.71850(ASP) | 0.301 | Plastic | 1.632 | 23.3 | -6.73 |
| 5 | | 2.18210(ASP) | 0.591 | | | | |
| 6 | Lens 3 | -1.50453(ASP) | 0.695 | Plastic | 1.544 | 55.9 | 2.54 |
| 7 | | -0.83843(ASP) | 0.341 | | | | |
| 8 | Lens 4 | -96.57700(ASP) | 0.300 | Plastic | 1.530 | 55.5 | -2.35 |
| 9 | | 1.26318(ASP) | 0.430 | | | | |
| 10 | IR-filter | Plano | 0.300 | Glass | 1.517 | 64.2 | |
| 11 | | Plano | 0.393 | | | | |
| 12 | Image | Plano | | | | | |

TABLE 8

Aspheric Coefficients

| Surface # | 1 | 2 | 4 | 5 |
|---|---|---|---|---|
| k = | -3.04563E-01 | -1.00000E+00 | -2.95906E+01 | -3.49224E+00 |
| A4 = | 3.43573E-03 | -2.32459E-01 | -1.12515E-01 | 1.02787E-01 |
| A6 = | -9.15568E-02 | 4.18976E-01 | 4.01346E-01 | 1.64621E-01 |
| A8 = | 1.67638E-01 | -8.73286E-01 | -8.23521E-01 | -9.71682E-02 |
| A10 = | -2.59214E-01 | 7.12374E-01 | 1.45334E+00 | 3.26713E-01 |
| A12 = | | -1.58817E-01 | -1.14820E+00 | |

| Surface # | 7 | 8 |
|---|---|---|
| k = | -6.07610E-01 | -1.00000E+02 |
| A4 = | 2.26380E-01 | -2.79263E-01 |
| A6 = | -5.99915E-01 | 1.54188E-01 |
| A8 = | 1.01462E+00 | -1.31345E-02 |
| A10 = | -1.03309E+00 | -8.37145E-03 |
| A12 = | 2.58708E-01 | -6.77688E-04 |

TABLE 8-continued

| Aspheric Coefficients | | |
|---|---|---|
| A14 = | 5.18344E−01 | 1.35928E−03 |
| A16 = | −2.94943E−01 | −2.11742E−04 |

| Surface # | 6 | 9 |
|---|---|---|
| k = | 5.12786E−02 | −8.44034E+00 |
| A1 = | | |
| A2 = | | |
| A3 = | | |
| A4 = | −1.32282E−01 | −2.06422E−01 |
| A5 = | | |
| A6 = | −5.51653E−01 | 1.24229E−01 |
| A7 = | | |
| A8 = | 4.14476E−01 | −5.35768E−02 |
| A9 = | | |
| A10 = | 3.33668E−01 | 1.07205E−02 |
| A11 = | | |
| A12 = | −1.40966E+00 | 5.77015E−04 |
| A13 = | | |
| A14 = | 2.81927E+00 | −6.11047E−04 |
| A15 = | | |
| A16 = | −1.64366E+00 | 7.13700E−05 |

TABLE 9

| | Embodiment 1 | Embodiment 2 | Embodiment 3 | Embodiment 4 |
|---|---|---|---|---|
| F | 3.21 | 3.30 | 3.35 | 3.41 |
| Fno | 2.80 | 3.20 | 2.90 | 2.43 |
| HFOV | 35.2 | 34.6 | 33.8 | 33.4 |
| \|N1−N2\| | 0.088 | 0.088 | 0.088 | 0.088 |
| \|V1−V3\| | 0.0 | 0.0 | 0.1 | 0.0 |
| \|V3−V4\| | 32.5 | 0.0 | 0.0 | 0.4 |
| f/f1 | 1.15 | 1.19 | 1.75 | 1.31 |
| f/f3 | 0.63 | 1.04 | 1.21 | 1.34 |
| (R3 + R4)/(R3 − R4) | −7.14 | −4.00 | 0.96 | 2.72 |
| R7/R8 | −33.39 | −2.93 | −63.91 | −76.46 |
| SL/TTL | 0.87 | 0.88 | 0.87 | 0.84 |
| BFL/TTL | 0.23 | 0.26 | 0.29 | 0.26 |
| SAG42/f | −0.06 | −0.03 | −0.08 | −0.08 |
| TTL/ImgH | 1.75 | 1.85 | 1.71 | 1.72 |

In the present optical lens system for taking image, the lens elements can be made of glass or plastic. If the lens elements are made of glass, there is more freedom to distribute the refractive power of the optical lens system. If the lens elements are made of plastic, the cost will be effectively reduced.

It is to be noted that the tables 1-8 show different data from the different embodiments, however, the data of the different embodiments is obtained from experiments. Therefore, any product of the same structure is deemed to be within the scope of the present invention even if it uses different data. Table 9 lists the relevant data for the various embodiments of the present invention.

While we have shown and described various embodiments in accordance with the present invention, it should be clear to those skilled in the art that further embodiments may be made without departing from the scope of the present invention.

What is claimed is:

1. An optical lens system for taking image comprising, in order from the object side to the image side:
    a first lens element with positive refractive power having a convex object-side surface;
    an aperture stop;
    a second lens element with negative refractive power;
    a third lens element having a convex object-side surface; and
    a fourth lens element with negative refractive power having a concave object-side surface, an image-side surface of the fourth lens element being aspheric, inflection points being formed on the image-side surface of the fourth lens element;
    a distance from the image-side surface of the fourth lens element to an image plane along an optical axis being BFL, a total track length of the optical lens system for taking image being TTL, they satisfying the relation:

$BFL/TTL > 0.12$, in the optical lens system for taking image, the number of lens elements with refractive power being limited to four.

2. The optical lens system for taking image as claimed in claim 1, wherein the image-side surface of the fourth lens element is concave, the fourth lens element is made of plastic material, and the object-side surface of the fourth lens element is aspheric.

3. The optical lens system for taking image as claimed in claim 2, wherein an image-side surface of the second lens element is convex, and at least one of the image-side surface and an object-side surface of the second lens element is aspheric.

4. The optical lens system for taking image as claimed in claim 3, wherein the third lens element has positive refractive power, an image-side surface of the third lens element is convex, and at least one of the image-side surface and the object-side surface of the third lens element is aspheric.

5. The optical lens system for taking image as claimed in claim 4, wherein an object-side surface of the second lens element is concave, the second lens element is made of plastic material, and the object-side surface and the image-side surface of the second lens element are aspheric.

6. The optical lens system for taking image as claimed in claim 5, wherein a focal length of the optical lens system for taking image is f, a focal length of the first lens element is f1, and they satisfy the relation:

$0.8 < f/f1 < 1.45$.

7. The optical lens system for taking image as claimed in claim 6, wherein the focal length of the optical lens system for taking image is f, a focal length of the third lens element is f3, and they satisfy the relation:

$0 < f/f3 < 0.85.$

8. The optical lens system for taking image as claimed in claim 5, wherein an Abbe number of the first lens element is V1, an Abbe number of the third lens element is V3, an Abbe number of the fourth lens element is V4, and they satisfy the relations:

$|V1 - V3| < 15;$ $|V3 - V4| > 15.$

9. The optical lens system for taking image as claimed in claim 5, wherein a refractive index of the first lens element is N1, a refractive index of the second lens element is N2, and they satisfy the relation:

$|N1 - N2| < 0.12.$

10. The optical lens system for taking image as claimed in claim 5, wherein an image-side surface of the first lens element is concave, and the first lens element is made of plastic material and at least one of the image-side surface and object-side surface of the first lens element is aspheric.

11. The optical lens system for taking image as claimed in claim 2, wherein a distance from the aperture stop to the image plane is SL, the total track length of the optical lens system for taking image is TTL, and they satisfy the relation:

$SL/TTL < 0.92.$

12. The optical lens system for taking image as claimed in claim 11, wherein an object to be photographed is imaged on an electronic imaging sensor, the total track length of the optical lens system for taking image is TTL, an image height of the optical lens system for taking image is ImgH, and they satisfy the relation:

$TTL/ImgH < 2.10.$

13. The optical lens system for taking image as claimed in claim 12, wherein the object to be photographed is imaged on the electronic imaging sensor, the total track length of the optical lens system for taking image is TTL, the image height of the optical lens system for taking image is ImgH, and they satisfy the relation:

$TTL/ImgH < 1.95.$

14. The optical lens system for taking image as claimed in claim 11, wherein a height of the image-side surface of the fourth lens element at a position of its effective optical diameter is SAG42, a focal length of the optical lens system for taking image is f, and they satisfy the relation:

$SAG42/f < -0.02.$

15. The optical lens system for taking image as claimed in claim 12, wherein the distance from the image-side surface of the fourth lens element to the image plane along the optical axis is BFL, the total track length of the optical lens system for taking image is TTL, and they satisfy the relation:

$BFL/TTL > 0.15.$

16. An optical lens system for taking image comprising, in order from the object side to the image side:
 a first lens element with positive refractive power;
 a plastic second lens element with negative refractive power having a concave object-side surface and a convex image-side surface, the object-side surface and the image-side surface of the second lens element being aspheric;
 a third lens element with positive refractive power having a convex object-side surface; and
 a plastic fourth lens element with negative refractive power having a concave object-side surface, an image-side surface of the fourth lens element being aspheric, inflection points being formed on the image-side surface of the fourth lens element, a distance from the image-side surface of the fourth lens element to an image plane along an optical axis being BFL, a total track length of the optical lens system for taking image being TTL, they satisfying the relation:

$BFL/TTL > 0.12;$ in the optical lens system for taking image, the number of lens elements with refractive power being limited to four.

17. The optical lens system for taking image as claimed in claim 16, wherein an object-side surface of the first lens element is convex, an image-side surface of the third lens element is convex, at least one of the image-side surface and the object-side surface of the third lens element is aspheric, the image-side surface of the fourth lens element is concave, and the object-side surface of the fourth lens element is aspheric.

18. The optical lens system for taking image as claimed in claim 17, wherein a refractive index of the first lens element is N1, a refractive index of the second lens element is N2, and they satisfy the relation:

$|N1 - N2| < 0.12.$

19. The optical lens system for taking image as claimed in claim 17, wherein an object to be photographed is imaged on an electronic imaging sensor, the total track length of the optical lens system for taking image is TTL, an image height of the optical lens system for taking image is ImgH, and they satisfy the relation:

$TTL/ImgH < 1.95.$

* * * * *